March 1, 1938. F. C. BEST 2,109,816
HYDRAULIC VALVE TAPPET
Filed Dec. 21, 1935
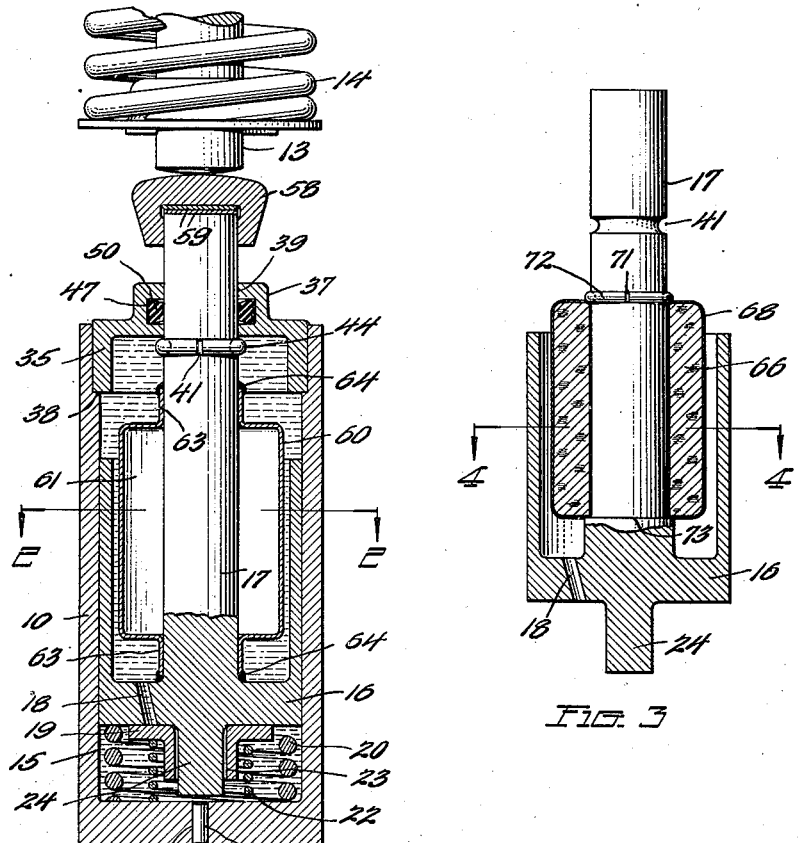
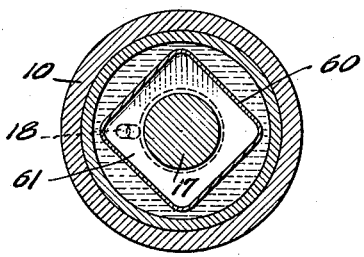
Inventor
FRANK C. BEST
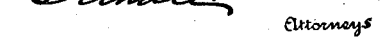
By
Attorneys Patented Mar. 1, 1938

2,109,816

UNITED STATES PATENT OFFICE 2,109,816

HYDRAULIC VALVE TAPPET

Frank C. Best, Detroit, Mich., assignor to Packard Motor Car Company, Detroit, Mich., a corporation of Michigan Application December 21, 1935, Serial No. 55,653

19 Claims. (Cl. 123—90)

This invention relates to improvements in the operating mechanism for the valves of internal combustion engines and is more particularly concerned with devices for eliminating clearance and play in the mechanism in order to secure more efficient and quiet operation of the valves, and in methods of assembling such devices.

It has heretofore been proposed to employ take-up devices of the general character indicated, but such devices have not proven wholly satisfactory from a practical standpoint. Thus it is essential for satisfactory performance that such devices be capable of functioning properly over the extreme range of temperature established in actual use, that they be capable of withstanding the stresses resulting from high frequency impulses to which they are subjected when employed with modern high speed engines, and that they shall be of sufficiently small size and light weight to permit of use without adversely affecting the operation of conventional valve actuating mechanism or requiring material alteration of the design of such mechanism.

It is proposed by the present invention to meet these various requirements and to provide a small and compact device which is of light weight and which will function, for an indefinite period without any attention, to automatically regulate or eliminate clearance in the valve mechanism. In its more specific aspect the invention is concerned with the provision of a valve tappet which may be readily employed as a substitute for valve tappets or cam followers now commonly interposed between the cam shaft and the valve stem of poppet valves. It is a feature of the invention that the device, whether intended for use as a tappet or for association in some other way with conventional valve mechanism, may be readily assembled and sold as a complete unit.

It is a further object of the invention to provide a device of the character described in which a liquid medium is employed to oppose displacement of the working parts except when necessary for the purpose of taking up clearance in the valve mechanism, the construction preferably being such that the liquid may completely fill and be sealed within a closed fluid system, air being thus permanently excluded from the system so as to ensure uniformity of action.

It is a further object of the invention to provide a valve tappet which is preferably generally cylindrical in shape and of a length and diameter comparable to that of known non-adjustable or manually adjustable tappets, the working parts of the tappet being so arranged as to occupy a portion only of the length of the tappet.

An important feature of the invention is the provision of means affording compensation for varying pressure and volume of the fluid within the system, such variation resulting, for instance, from the wide range of temperatures to which devices of this character are subjected when in operation. This means is particularly desirable in the event the fluid system is completely filled with liquid, devices of the prior art being defective in that they fail to afford adequate provision for the expansion of the liquid when heated and for accommodation of the excessive pressure thereby developed in the system. In the preferred embodiment of the invention compensation is effected by means of a deformable member which is partially collapsed or distorted on the application of excessive pressure thereto so as to increase the capacity of the fluid system, this member being located within the device itself and thus protected against possible damage.

Further objects and features of the invention will be apparent from the following description taken in connection with the accompanying drawing, in which Figure 1 is a transverse sectional view of a device constructed in accordance with the principles of the invention, illustrating the application of the invention to a tappet for the actuation of the conventional internal combustion engine poppet valve;

Figure 2 is a sectional view taken substantially on the line 2—2 of Figure 1;

Figure 3 is a view illustrating a modified form of the device and showing elements corresponding to certain only of the elements shown in Figure 1; and Figure 4 is a section on the line 4—4 of Figure 3.

In describing the invention reference is made to the preferred forms thereof illustrated in the accompanying drawing and specific language is employed. It will nevertheless be understood that no limitation of the scope of the invention is thereby intended and that various further modifications and alterations of the illustrated structure are contemplated.

In the form of the invention shown in Figure 1 illustrating the embodiment of the invention in a valve tappet, it will be observed that the tappet is of the barrel type and includes an outer shell or casing 10 of generally cylindrical shape and open at one end, the casing being preferably dimensioned for reception in the cylindrical tappet guide commonly associated with the engine block of internal combustion engines, in which guide the tappet is reciprocated by means of a cam 11 on the usual cam shaft 12 in order to alternately open and close the engine valve. Such an arrangement is quite conventional and is illustrated, for instance, in more detail in Figures 1 and 2 of my copending application, Serial No. 26,483, filed June 13, 1935.

The device is preferably constructed to afford a closed and sealed fluid system which is disposed entirely within the casing 10 in order to provide a self-contained unit, the working parts of which are protected against damage. Thus the casing 10 may be formed interiorly thereof to provide a cylinder 15 in which is slidably received the head portion 16 of a piston, the stem portion 17 of the piston extending longitudinally of the casing 10 and engaging at its outer end, preferably through a simple form of length adjusting device, with the stem 13 of the engine valve.

The piston may be yieldingly urged toward the open end of the casing 10 by means of a coil spring 20, the spring 20 being interposed under compression between the head or closed end of the casing 10 and the head portion 16 of the piston. The latter is provided with a passage 18 extending therethrough and affording communication between the cylinder 15 and the outer part of the casing 10, this passage being controlled by a valve 19 which is normally retained in seated position against the mouth of the passage 18 by means of a coil spring 22, the latter acting under compression between the head end of the casing 10 and valve 19. The valve 19 is preferably deformed or otherwise constructed to provide a central aperture 23 for reception on a stud 24 of generally cylindrical shape, the stud 24 being formed on the head portion 16 of the piston and serving as a guide for the valve 19 and coil spring 22. The head end of the casing 10 is provided with a port 26 which is normally closed by a plug 27, the function of this port being hereinafter more particularly described.

The elements of the device thus far mentioned are simple and function in a manner common in the art to which the invention relates. If the casing 10 be supplied with liquid on each side of the head portion 16 of the piston, the valve 19 will permit liquid to flow through the passage 18 and into the cylinder 15 on outward movement of the piston but will prevent rapid movement of the piston into the cylinder, flow of liquid out of the cylinder taking place only very gradually as the result of leakage between the head portion 16 of the piston and the cylinder walls. The spring 20 yieldingly urges the piston outward and thus tends to engage the piston stem 17 with the lower end of the engine valve stem, taking up any clearance which may exist in the valve actuating mechanism. As the cam shaft is rotated, and the tappet as a whole is moved upwardly, the tappet piston and the casing 10 act as a rigid unit, the cam thrust being transmitted to the engine valve stem 13 to unseat the engine valve. Expansion of liquid within the cylinder 15 as the result of increase in temperature causes gradual seepage of liquid past the piston without increase in the effective length of the tappet. Corresponding increase in length of other parts of the valve actuating mechanism as the temperature rises is likewise accommodated by gradual discharge of liquid from the cylinder 15. At the same time, any play in the valve actuating mechanism resulting from decrease in temperature of the parts thereof results in immediate outward compensating movement of the piston, liquid flowing into the cylinder 15 through the passage 18 to retain the parts of the tappet against contraction. Thus the device may be described as a member of which the effective length is automatically and rapidly increased whenever such increase is permitted, but which may be contracted in length only at a fairly slow rate so that during operation the device acts as a substantially rigid member under compression in the valve actuating train. The force of the spring 20 is of course less than that exerted by the engine valve spring 14 so that there is no tendency to unseat the valve other than by operation of the usual valve cam shaft.

In order that the device may be constructed as a self-contained unit, and to avoid the complicated structure required to continually supply liquid to the device from an outside source, the fluid system incorporated in the device is completely closed.

For this purpose I may provide a closure member 35 which is received in the outer end of the casing 10 with a press fit, seating on an annular flange 38 formed interiorly of the casing. The closure member may be formed with a boss 37 having a central aperture 39 therein through which the outer end of the piston stem 17 extends, the latter being provided with an abutment arranged to engage the closure member 35 to limit outward movement of the piston. For instance the piston stem 17 may be provided with an annular groove 41 for the reception of a ring 44 which is somewhat flexible and which is snapped into position in the groove.

The boss 37 may be further provided with an annular groove 47 in which is received an annular element 50 of deformable material, for example rubber or rubber-like material which has been treated to resist attack by the liquid which is to be employed in the device. The annular element 50 is preferably surface bonded both to the piston stem 17 and to the walls of the groove 47 in which it seats; in the case of rubber or like material, vulcanization is resorted to. Thus the piston is permitted to partake of small displacement axially of the casing 10, the annular member 50 being distorted to the extent necessary to permit such displacement, while at the same time effectively sealing the casing 10.

As hereinbefore suggested, it is an important feature of the invention, particularly where air or other compressible fluid is entirely excluded from the fluid system, to provide for the expansion and contraction of liquid within the casing 10 which must necessarily take place in practice. For this purpose I prefer to provide a deformable member which, in the embodiment of the invention shown in Figure 1, is indicated at 60 and is constituted principally by a flexible wall surrounding and secured to the piston stem 17 and forming therewith an empty chamber 61. The shape of the chamber 61 as viewed in cross-section may vary. I prefer to form the member 60 so that the chamber will be generally rectangular in outline as shown more particularly in Figure 2, this shape lending itself more readily to deformation on the application of fluid pressure to the outer wall thereof than would a circular chamber. The material of which the member 60 is formed may be fairly thin sheet metal or any other flexible material but is preferably of such a nature that the member is self-sustaining. In the event sheet metal is used, the member 60 may be deformed at either end to provide generally tubular portions 63 snugly engaging the piston stem 17 and secured thereto as indicated at 64 by welding or soldering. A silver solder has been found quite satisfactory for this purpose.

It will be observed that this member 60 lies wholly within the casing 10 and is disposed within the fluid reservoir which is constituted by that portion of the casing outward of the head portion 16 of the piston. Of course the member 60 need not be secured to the piston stem and may be disposed elsewhere in the reservoir, but I have found this construction quite convenient for purposes of assembly and highly satisfactory in operation, there being obviously no interference whatever with the free movement of the piston as the result of deformation of the member 60.

As the temperature to which the device is subjected rises, and the liquid within the casing 10 expands, the resulting increased pressure deforms the walls of the member 60, causing them to collapse or flex inward slightly so that the development of excessive pressure which might interfere with outward movement of the piston such as is required to take up clearance in the valve actuating mechanism is definitely prevented; the increased volume of liquid resulting from increase in temperature is effectively compensated by the increased capacity of the fluid reservoir resulting from flexure of the member 60. Thus this member serves to automatically and substantially equalize pressure and volume conditions within the device.

In Figures 3 and 4 a slightly modified construction is shown, the member 60 being replaced by an annular member 66 of generally similar shape and location and performing a similar function. This member 66 may be formed of deformable material such as cork, rubber, or the like, cork being preferred. Unless the material selected is one which is resistant to penetration and attack by the liquid employed in the device, the member is preferably coated with a substance impervious to the liquid, for instance shellac or a special recently developed heat resisting synthetic rubber, this coating being designated at 68. Obviously the material employed will depend primarily on the nature of the liquid which is to be used, various types of oil, kerosene, and the like having been heretofore proposed.

The member 66 may be retained in position on the piston stem 17 in any convenient manner. For instance, a groove 71 may be formed in the stem outwardly of the member 67 and a resilient ring 72 may be snapped into place in the groove, this ring retaining the member 66 in position against a shoulder 73 formed adjacent the inner end of the piston stem.

The construction may be otherwise identical with that shown in Figure 1, and the device will obviously function in the same manner, the member 66 being compressed on the development of fluid pressure within the casing 10 and thus affording increased capacity in the fluid reservoir.

The complete filling of the system with liquid and the exclusion of air therefrom is important if most efficient operation is to be obtained. Thus it has long been recognized that in devices of this character which are violently agitated in use, any small quantity of air which may be in contact with the liquid in the device forms an emulsion with the liquid. During continued operation this emulsion or a portion of it eventually finds its way into the cylinder and substantially increases the compressibility of the fluid within the cylinder. As a result, the device no longer functions as a rigid thrust transmitting element but yields slightly on each impulse so that the port controlled by the engine valve is not fully opened.

A satisfactory method of completely filling devices of this character with liquid is illustrated more particularly in my copending application Serial No. 55,652, filed concurrently herewith, the method involving the assembly of the device while the parts thereof are immersed in the liquid. This method can be readily applied to the device illustrated in this application, the deformable member being first secured in position on the piston stem 17, the abutment ring 44 being located as suggested herein, and the closure member 35 being fitted on the stem outwardly of the ring 44 by the surface bonding of the annular element 50 to the closure member and the piston stem. The valve 19 and coil spring 22 are then assembled on the stud 24, the coil spring 22 introduced in the casing 10, and the two units are thus made ready for the several steps outlined in my last named copending application. As described in that application, the pressing of the closure member 35 in the open end of the casing 10 and of the plug 27 in the port 26 is effected by the use of suitable pressure applying tools while the parts are completely immersed.

As hereinbefore pointed out, the device is particularly useful as a substitute for non-adjustable or mechanically adjustable tappets and it is preferable to provide some means for effecting an initial manual adjustment of the effective length of the tappet so that all the tappets in an engine may be subjected to the same degree of compression and will behave uniformly. In order that this adjustment may be quickly and effectively made and in order that the over-all length of the tappet need not be unduly increased by cumbersome mechanism, I prefer to employ an arrangement such as shown in Figure 1 including a cap 58 which is dimensioned to receive the outer end of the valve stem 17, one or more shims 59 being placed beneath the cap before the latter is inserted in position. Preferably the method of assembly is as follows.

As initially formed the piston is urged outwardly of the casing, outward movement being limited by engagement of the ring 44 on the piston stem 17 with the closure member 35 as hereinbefore indicated. The tappet is placed in position in the engine tappet guide with a cap 58 in position on the piston stem while the engine valve stem 13 and spring 14 are raised, and the latter are then released. The clearance between the lower end of the engine valve stem 13 and the cap 58 is then carefully measured and a shim 59 of slightly greater thickness than this measured clearance is selected; for instance, in practice this shim may be about .002 inch thicker than the measured clearance. The engine valve and valve spring are then raised, and the selected shim is inserted beneath the cap 58. On release of the engine valve and spring the piston stem 17 is displaced downwardly in the casing 10 so that the ring 44 is spaced from the closure member 35 by the amount of the added thickness of the selected shim 59 determined in the manner hereinbefore explained, for instance about .002 inch. Each tappet of the engine is now compressed to precisely the same extent and approximately the same force acts on the piston of each tappet to urge the same outwardly of its associated casing.

If care is exercised in assembling the device there is obviously no possibility of discharge of liquid therefrom. If, however, leakage of liquid should for any reason occur, the device will still function since the stud 24 will engage the adjacent end of the casing 10 to limit inward movement of the piston. Although this will result in noisy operation by reason of the increased clearance between the engine valve stem and the tappet, total failure will not occur.

Various changes in the preferred embodiments of the invention illustrated herein will readily occur to one skilled in the art to which the invention relates and I do not confine myself to the details of the illustrated structure except to the extent that such details are specifically included in the claims appended hereto.

Having thus described the invention, what is claimed as new and desired to be secured by Letters Patent is:

1. In an automatically expansible valve take-up device, the combination with a cylinder, of a piston moving in said cylinder, means yieldingly urging said piston outwardly of said cylinder, a fluid reservoir supplying liquid to said cylinder on outward movement of the piston, means resisting rapid discharge of liquid from said cylinder to said reservoir, means enclosing said reservoir to form with said reservoir and cylinder a sealed fluid system, and a deformable member disposed within said reservoir to compensate for volume changes of fluid in said reservoir.

2. In an automatically expansible valve take-up device, the combination with a cylinder, of a piston moving in said cylinder, means yieldingly urging said piston outwardly of said cylinder, a fluid reservoir supplying liquid to said cylinder on outward movement of the piston, means resisting rapid discharge of liquid from said cylinder to said reservoir, means enclosing said reservoir to form with said reservoir and cylinder a sealed fluid system, and a member disposed within said reservoir and capable of yielding under pressure to increase the capacity of the reservoir, whereby excessive rise of pressure within the reservoir is prevented.

3. In an automatically expansible valve take-up device, the combination with a cylinder, of a piston moving in said cylinder, means yieldingly urging said piston outwardly of said cylinder, a fluid reservoir supplying liquid to said cylinder on outward movement of the piston, means resisting rapid discharge of liquid from said cylinder to said reservoir, means enclosing said reservoir to form with said reservoir and cylinder a sealed fluid system, and a member within said reservoir deformable in response to pressure to compensate for increased pressure of fluid in the reservoir.

4. In an automatically expansible valve take-up device, the combination with a cylinder, of a piston moving in said cylinder, means yieldingly urging said piston outwardly of said cylinder, a fluid reservoir supplying liquid to said cylinder on outward movement of the piston, means resisting rapid discharge of liquid from said cylinder to said reservoir, and means enclosing said reservoir to form with said reservoir and cylinder a sealed fluid system, said reservoir being defined by external and internal walls, said internal walls being deformable to compensate for increase in fluid pressure in said reservoir.

5. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, and a member in said casing expansible and contractible in response to fluid pressure changes therein.

6. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, and means in said casing expansible and contractible in response to fluid pressure changes therein, said last named means comprising a deformable element carried by said piston.

7. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, said piston having a stem extending exteriorly of said casing, and a member within said casing surrounding said stem, said last named means being deformable to compensate at least in part for rise in fluid pressure within said supply chamber.

8. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, and means in said casing expansible and contractible in response to fluid pressure changes therein, said last named means comprising a hollow, closed chamber.

9. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, and means in said casing expansible and contractible in response to fluid pressure changes therein, said last named means comprising an element of readily deformable material.

10. As an article of manufacture, an automatically expansive valve tappet having a compression cylinder and a liquid reservoir therefor, and a deformable member in said reservoir to equalize the pressure therein.

11. In an automatically expansible valve take-up device, the combination with a cylinder, of a piston moving in said cylinder, means yieldingly urging said piston outwardly of said cylinder, a fluid reservoir supplying liquid to said cylinder on outward movement of the piston, means resisting rapid discharge of liquid from said cylinder to said reservoir, means enclosing said reservoir to form with said reservoir and cylinder a sealed fluid system, and a device of variable volume disposed within said reservoir to compensate for volume changes of fluid in said reservoir, said fluid system being completely filled with liquid.

12. In an automatically expansible thrust element for use in valve actuating mechanism, the combination with a casing formed to provide a cylinder having a piston therein and a fluid supply chamber, of a passage affording communication between said cylinder and chamber, a check valve associated with said passage to resist rapid discharge of fluid from said cylinder, means sealing said casing to provide therein a closed fluid system, and means in said casing expansible and contractible in response to fluid pressure changes therein, said fluid system being completely filled with liquid.

13. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, and deformable means surface bonded to said stem and closure member to seal said casing while permitting relative movement of the piston and casing.

14. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, and deformable means surface bonded to said stem and closure member to seal said casing while permitting relative movement of the piston and casing, said deformable means comprising rubber.

15. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, and means carried by said closure member and surface bonded to said stem to seal said casing.

16. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, means carried by said closure member and surface bonded to said stem to seal said casing, and deformable means within said casing, whereby expansion of fluid on increase in temperature and pressure is permitted.

17. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, means carried by said closure member and surface bonded to said stem to seal said casing, and deformable means within said casing, whereby expansion of fluid on increase in temperature and pressure is permitted, said casing being completely filled with liquid.

18. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, means carried by said closure member and surface bonded to said stem to seal said casing, and a collapsible chamber within said supply chamber, said supply chamber and cylinder being entirely filled with liquid.

19. In an automatically expansible thrust element for use in valve actuating mechanism, the combination with a closed casing formed to provide a cylinder having a piston therein and a fluid supply chamber, of a passage affording communication between said cylinder and chamber, a check valve associated with said passage to resist rapid discharge of fluid from said cylinder, said piston having a stem extending exteriorly of said casing, a closure member having a press fit in said casing and an opening receiving said piston stem, means carried by said closure member and surface bonded to said stem to seal said casing, a collapsible chamber within said supply chamber, said supply chamber and cylinder being entirely filled with liquid, and a plugged liquid filling orifice in the head end of said cylinder.

FRANK C. BEST.